US010289727B2

(12) United States Patent
Bostick et al.

(10) Patent No.: US 10,289,727 B2
(45) Date of Patent: May 14, 2019

(54) INCORPORATION OF SEMANTIC ATTRIBUTES WITHIN SOCIAL MEDIA

(71) Applicant: International Business Machines Corporation, Armonk, NY (US)

(72) Inventors: James E. Bostick, Cedar Park, TX (US); Hernan A. Cunico, Holly Springs, NC (US); John M. Ganci, Jr., Cary, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 14/856,715

(22) Filed: Sep. 17, 2015

(65) Prior Publication Data
US 2017/0083599 A1    Mar. 23, 2017

(51) Int. Cl.
*G06F 17/30*    (2006.01)
*G06Q 50/00*    (2012.01)

(52) U.S. Cl.
CPC .... *G06F 17/30598* (2013.01); *G06F 17/3025* (2013.01); *G06F 17/3053* (2013.01); *G06F 17/30256* (2013.01); *G06F 17/30345* (2013.01); *G06F 17/30648* (2013.01); *G06F 17/30867* (2013.01); *G06F 17/30873* (2013.01); *G06F 17/30876* (2013.01); *G06Q 50/01* (2013.01)

(58) Field of Classification Search
CPC .......... G06Q 30/0218; G06Q 30/0263; G06Q 30/0282; G06Q 30/0254–30/0256; G06Q 30/0631; G06Q 50/01; G06F 17/30873; G06F 17/30867; G06F 17/241; G06F 17/30038; G06F 17/3089; G06F 17/30047; G06F 17/3053; G06F 17/2785; G06F 17/30648; G06F 17/30876; H04W 4/21; H04L 51/32
See application file for complete search history.

(56) References Cited

U.S. PATENT DOCUMENTS 7,933,451 B2    4/2011    Kloer
8,359,190 B2    1/2013    Kirshenbaum
(Continued)

OTHER PUBLICATIONS

Kumar, et al., "Machine Learning Based Predictive Model for Analysing the Sentiments in Short Text", An IP.com Prior Art Database Technical Disclosure, IP.com No. 000239081, IP.com Electronic Publication: Oct. 10, 2014, Copyright @ 2014 Cognizant Technology US Corp, 9 pages.
(Continued)

*Primary Examiner* — Srirama Channavajjala
(74) *Attorney, Agent, or Firm* — Christopher K. McLane; Daniel R. Simek (57) ABSTRACT

In an approach for adding categories to a social media site, a computer identifies one or more semantic attributes of content uploaded on a social media site, wherein the identified one or more semantic attributes correspond to viewable characteristics of the content uploaded on the social media site. The computer maps the identified one or more semantic attributes to one or more categories based on shared viewable characteristics of the identified one or more sematic attributes. The computer associates the one or more mapped categories to the content uploaded on the social media site.

20 Claims, 7 Drawing Sheets

(56) References Cited

U.S. PATENT DOCUMENTS

| | | | |
|---|---|---|---|
| 8,532,390 B2 | 9/2013 | Brown et al. | |
| 8,925,107 B2* | 12/2014 | Dagaeff | G06F 21/31 726/28 |
| 9,916,290 B2* | 3/2018 | Soon-Shiong | G06Q 30/02 |
| 2004/0230636 A1* | 11/2004 | Masuoka | G06F 9/451 708/800 |
| 2008/0208885 A1* | 8/2008 | Barber | G06F 17/2247 |
| 2009/0164408 A1* | 6/2009 | Grigorik | G06F 17/30867 |
| 2010/0312767 A1* | 12/2010 | Saito | G06F 17/3064 707/739 |
| 2011/0107369 A1* | 5/2011 | O'Brien | G06F 17/30029 725/38 |
| 2011/0282952 A1 | 11/2011 | Song | |
| 2012/0030587 A1* | 2/2012 | Ketkar | G06F 17/30038 715/751 |
| 2012/0130809 A1* | 5/2012 | Tedjamulia | G06Q 30/0255 705/14.53 |
| 2012/0166180 A1 | 6/2012 | Au | |
| 2012/0278387 A1* | 11/2012 | Garcia | G06Q 50/01 709/204 |
| 2012/0323738 A1* | 12/2012 | Gokturk | G06Q 30/02 705/26.63 |
| 2013/0073389 A1* | 3/2013 | Heath | G06Q 50/01 705/14.54 |
| 2013/0073400 A1* | 3/2013 | Heath | G06Q 30/02 705/14.73 |
| 2013/0096910 A1 | 4/2013 | Stan et al. | |
| 2013/0163009 A1* | 6/2013 | Wang | G06F 3/1243 358/1.6 |
| 2013/0166565 A1* | 6/2013 | Lepsoe | G06F 17/30873 707/740 |
| 2013/0262588 A1* | 10/2013 | Barak | H04L 67/22 709/204 |
| 2013/0346330 A1* | 12/2013 | Fleischman | G06Q 30/0201 705/319 |
| 2014/0003648 A1* | 1/2014 | Fedorovskaya | G06K 9/00677 382/100 |
| 2014/0044358 A1* | 2/2014 | Srinivasan | G06Q 50/01 382/190 |
| 2014/0059663 A1* | 2/2014 | Rajshekar | H04L 63/08 726/6 |
| 2014/0067535 A1* | 3/2014 | Rezaei | G06F 17/30598 705/14.54 |
| 2014/0115483 A1 | 4/2014 | Wetherell et al. | |
| 2014/0244361 A1* | 8/2014 | Zhang | G06Q 30/0204 705/7.33 |
| 2014/0337328 A1* | 11/2014 | Sarvabhotla | G06F 17/30867 707/723 |
| 2014/0355907 A1* | 12/2014 | Pesavento | G06F 17/30038 382/305 |
| 2014/0379426 A1* | 12/2014 | Guo | G06T 11/60 705/7.31 |
| 2018/0181548 A1* | 6/2018 | Soon-Shiong | G06Q 30/02 |

OTHER PUBLICATIONS

"Social Data Analysis as unobstrusive measure for validating human behavior assessment or test (Psychometric) results", An IP.com Prior Art Database Technical Disclosure, IP.com No. 000208050, IP.com Electronic Publication: Jun. 21, 2011, 9 pages.

"Sentiment Analysis for Social Media Screening", An IP.com Prior Art Database Technical Disclosure, IP.com No. 000236682, IP.com Electronic Publication: May 8, 2014, 4 pages.

"Related Content with More Like This", OpenPublish, 5 pages, printed Jun. 19, 2015, <http://openpublishing.com/node/17>.

\* cited by examiner

INCORPORATION OF SEMANTIC ATTRIBUTES WITHIN SOCIAL MEDIA

BACKGROUND

The present invention relates generally to the field of semantic attributes, and more particularly to analyzing semantic attributes associated with an image for improved sentiment content within social media.

Social media encompasses a collection of online communication channels dedicated to community-based input, interaction, content sharing, and collaboration that are accessible from any location with Internet access by mobile and web-based technologies, thus creating highly interactive platforms. Social media technologies include websites and/or applications that take on many different forms, such as blogs, business networks, enterprise social networks, forums, microblogs, photo sharing, product/service reviews, social bookmarking, social gaming, social networks, video sharing, and virtual worlds. Users employ computer-mediated tools associated with the social media to create, share, or exchange information, ideas, and pictures/videos within virtual communities and networks though the online communication channels. For example, a user posts a comment and an image on a social media website making the comment and the image viewable to other users. Upon viewing the post, the individuals are able to interact through the social media website with one another through interactions (e.g., comments, votes, sentiments, etc.) regarding the content of the post (e.g., comment and image).

Semantics is the study of meaning, such as what a source or sender expresses, communicates, or conveys in a message to an observer or receiver, what the receiver infers from the current context focusing on the relation between signifiers (e.g., words, phrases, signs, and symbols), and what the signifiers represent. Semantic properties or meaning properties are aspects of a linguistic unit, such as a morpheme (e.g., minimal grammatical units of a language), word, or sentence that contribute to the meaning of that linguistic unit and may describe the semantic components of a word. In this sense, semantic properties are used to define the semantic field of a word or set of words by grouping a set of words by meaning in which the set of words refers to a specific subject. For example, the word "man" infers the reference is human, male, and adult, whereas the word "female" is a common component of girl, woman, and actress.

SUMMARY

Aspects of the present invention disclose a method, computer program product, and system for adding categories to a social media site. The method includes one or more computer processors identifying one or more semantic attributes of content uploaded on a social media site, wherein the identified one or more semantic attributes correspond to characteristics of the content uploaded on the social media site. The method further includes one or more computer processors mapping the identified one or more semantic attributes to one or more categories based on shared viewable characteristics of the identified one or more sematic attributes. The method further includes one or more computer processors associating the one or more mapped categories to the content uploaded on the social media site.

DETAILED DESCRIPTION

Social networks typically include the ability for users to provide feedback on the content of a post (e.g., published information on the Internet) in forms of likes, ratings, comments, or similar concepts. As recognized by embodiments of the present invention, the sentiment of "like" or comments is not categorized nor does the sentiment address sentiments pertaining to more than one aspect of a post. For example, a user may "like" a posted image but is unable to specify what in the image resulted in the user selecting "like." Embodiments of the present invention create multiple categories of sentiment based on the semantics of comments and determined objects from within an image. Additionally, embodiments of the present invention recognize users are currently unable to group and/or filter sentiments based on personal preferences. Embodiments of the present invention provide a user interface that stacks the sentiments and comments, and allows users an ability to sort and navigate through the stacked sentiments based on preferences.

Figure 1:
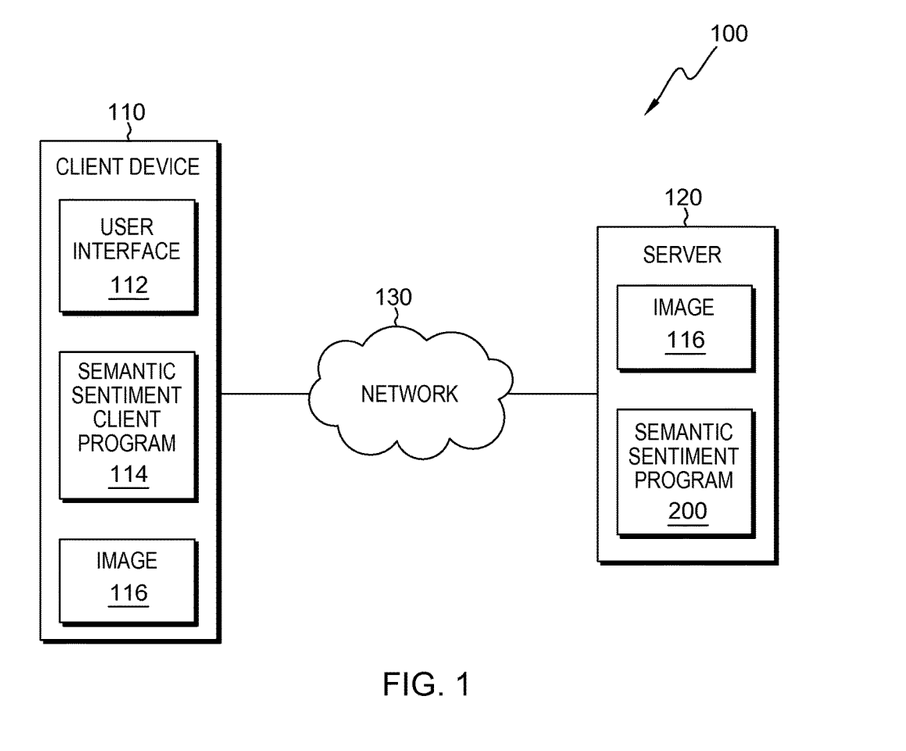
FIG. 1 is a functional block diagram illustrating a social media environment, in accordance with an embodiment of the present invention.

The present invention will now be described in detail with reference to the Figures. FIG. 1 is a functional block diagram illustrating a social media environment, generally designated social media environment 100, in accordance with one embodiment of the present invention. FIG. 1 provides only an illustration of one embodiment and does not imply any limitations with regard to the environments in which different embodiments may be implemented.

In the depicted embodiment, social media environment 100 includes client device 110 and server 120 interconnected over network 130. Social media environment 100 may include additional computing devices, mobile computing devices, servers, computers, storage devices, or other devices not shown.

Client device 110 may be a web server or any other electronic device or computing system capable of processing program instructions and receiving and sending data. In some embodiments, client device 110 may be a laptop computer, a tablet computer, a netbook computer, a personal computer (PC), a desktop computer, a personal digital assistant (PDA), a smart phone, or any programmable electronic device capable of communicating with network 130. In other embodiments, client device 110 may represent a server computing system utilizing multiple computers as a server system, such as in a cloud computing environment. In general, client device 110 is representative of any electronic device or combination of electronic devices capable of executing machine readable program instructions as described in greater detail with regard to FIG. 5, in accordance with embodiments of the present invention. Client device 110 contains user interface 112, semantic sentiment client program 114, and image 116.

User interface 112 is a program that provides an interface between a user of client device 110 and a plurality of applications that reside on client device 110 (e.g., semantic sentiment client program 114) and/or may be accessed over network 130. A user interface, such as user interface 112, refers to the information (e.g., graphic, text, sound) that a program presents to a user and the control sequences the user employs to control the program. A variety of types of user interfaces exist. In one embodiment, user interface 112 is a graphical user interface. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interface 112 sends and receives information through semantic sentiment client program 114 to semantic sentiment program 200.

Semantic sentiment client program 114 is a program designed to interact with semantic sentiment program 200. In one embodiment, semantic sentiment client program 114 sends image 116 to semantic sentiment program 200 for processing and uploading to a social media site. In another embodiment, semantic sentiment client program 114 sends user inputs (e.g., comments, preferences, etc.) to semantic sentiment program 200 for processing and uploading to the social media site. In some other embodiment, semantic sentiment client program 114 sends image 116 and user inputs to semantic sentiment program 200 for processing and uploading to the social media site. Semantic sentiment client program 114 displays results received from semantic sentiment program 200. In the depicted embodiment, semantic sentiment client program 114 resides on client device 110. In another embodiment, semantic sentiment client program 114 may reside on server 120 or on another device (not shown) connected over network 130 provided semantic sentiment client program 114 is able to access semantic sentiment program 200 and image 116.

Image 116 is a digital image depiction or recording of a visual perception of a physical item (e.g., photograph) that is captured by an optical device (e.g., cameras, digital cameras, scanners, computer graphics). A digital image is a numeric representation of a two-dimensional image (e.g., raster image, bitmap image) containing a finite set of digital values (e.g., pixels) stored as rows and columns with brightness and color. In the depicted embodiment, image 116 resides on client device 110 and server 120 (e.g., copy of image 116 is placed on a social media site after an upload occurs). For example, a user of client device 110 takes a picture, thus creating image 116. The user, through user interface 112 and semantic sentiment client program 114, uploads image 116 to semantic sentiment program 200 and server 120 for display on a social media site. In another embodiment, image 116 may reside on another client device, server, or storage device (not shown) provided image 116 is accessible to semantic sentiment client program 114 and semantic sentiment program 200.

Server 120 may be a management server, a web server, or any other electronic device or computing system capable of receiving and sending data. In some embodiments, server 120 may be a laptop computer, a tablet computer, a netbook computer, a personal computer (PC), a desktop computer, a personal digital assistant (PDA), a smart phone, or any programmable device capable of communication with client device 110 over network 130. In other embodiments, server 120 may represent a server computing system utilizing multiple computers as a server system, such as in a cloud computing environment. Server 120 includes image 116 and semantic sentiment program 200.

Network 130 may be a local area network (LAN), a wide area network (WAN), such as the Internet, a wireless local area network (WLAN), any combination thereof, or any combination of connections and protocols that will support communications between client device 110, server 120, and other computing devices and servers (not shown), in accordance with embodiments of the inventions. Network 130 may include wired, wireless, or fiber optic connections.

Semantic sentiment program 200 is a program for enhancing the user interface associated with social media for responding to a post through social sentiment categories and viewing responses to the post within the social sentiment categories based on user preferences. Semantic sentiment program 200 adds additional social sentiment categories based on semantic attributes to an image posted on social media based on image processing and semantic analysis. Additionally, semantic sentiment program 200 provides an enhanced user interface allowing the organization and navigation of sentiment content (e.g., responses to posts) based on user preferences. In the depicted embodiment, semantic sentiment program 200 resides on server 120. In another embodiment, semantic sentiment program 200 resides on client device 110. In some other embodiment, semantic sentiment program 200 resides on other computing devices and servers (not shown) provided semantic sentiment program 200 is accessible by semantic sentiment client program 114.

Figure 2:
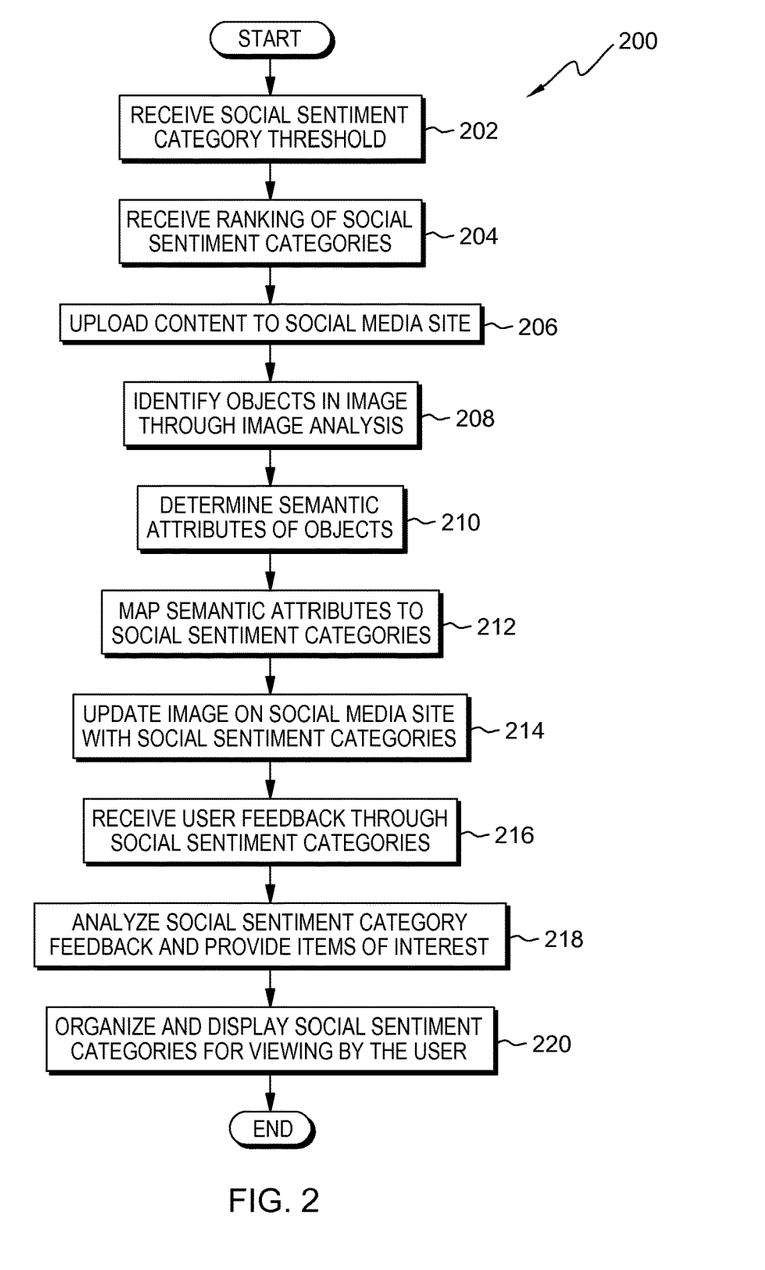
FIG. 2 is a flowchart depicting operational steps of a semantic sentiment program on a server computer within the social media environment of FIG. 1 for adding sentiments based on multiple aspects of an image and organizing received sentiments for viewing, in accordance with an embodiment of the present invention.

FIG. 2 is a flowchart depicting operational steps of semantic sentiment program 200, a program for adding sentiments based on multiple aspects of an image and organizing received sentiments for viewing, in accordance with an embodiment of the present invention. In the depicted embodiment, semantic sentiment program 200 is incorporated within social media sites and therefore runs as part of the social media sites. Semantic sentiment program 200, however, may be exited at any time upon receipt of a user action to discontinue use. Prior to initiating, the user of client device 110 accesses a social media site through user interface 112 and semantic sentiment client program 114. Semantic sentiment program 200 initiates when a user, though user interface 112 and semantic sentiment client program 114, selects to create a post within the social media site. In one embodiment, semantic sentiment program 200 initiates upon receipt of a request to create a post by uploading image 116 to the social media site. In another embodiment, semantic sentiment program 200 initiates upon receipt of a request to create a post by uploading a comment to the social media site. In some other embodiment, semantic sentiment program 200 initiates upon receipt of a request to create a post by uploading image 116 and an associated comment.

In step 202, semantic sentiment program 200 receives a social sentiment category threshold. The social sentiment category threshold defines the maximum number of social sentiment categories allowed to be associated with a post on a social media site. A social sentiment category is a grouping of items based on shared characteristics (e.g., viewable characteristics) that exist in hierarchies with sub-categories (e.g., semantic attributes) that tier to a top level category. For example, "vehicle" is the top level category, followed by "car," then "car manufacturer," and finally "car model." Semantic attributes describe the social sentiment category but may also become social sentiment categories. For example, "wheel" is a category that includes semantic attributes "tires" and "steering wheel," that while being semantic attributes of "vehicle," are also part of individual category hierarchies specific to tires and steering wheels.

While semantic sentiment program 200 may include semantic attributes as a social sentiment category for each individual characteristic, the feedback to semantic sentiment program 200, and hence forth the users, may not be as meaningful. For example, a photograph includes one hundred people that are identified as one hundred separate semantic attributes. Therefore, semantic sentiment program 200 includes one hundred social sentiment categories in order to represent each individual (e.g., semantic attribute) within the photograph for feedback. However, by semantic sentiment program 200 limiting the number of allowed social sentiment categories, more focused feedback may be received. In one embodiment, semantic sentiment program 200 receives the social sentiment category threshold as defined by the service provider (e.g., a social media site limits the allowable number of categories). In another embodiment, semantic sentiment program 200 receives the social sentiment category threshold as defined by the user through semantic sentiment client program 114 (e.g., selects less than the social media site allows, enters number of desired categories). In one embodiment, semantic sentiment program 200 does not receive a predefined list of social sentiment categories, and semantic sentiment program 200 determines social sentiment categories through image analysis performed at the time semantic sentiment program 200 posts image 116 to the social media site. In some other embodiment, semantic sentiment program 200 receives a list of predefined social sentiment categories in addition to a social sentiment category threshold.

In one embodiment, semantic sentiment program 200 receives the social sentiment category threshold and the list of predefined categories as defined by the service provider (e.g., social media site). For example, the social media site is focused on reviews of which only five known social sentiment categories are possible. Semantic sentiment program 200 receives the social sentiment category threshold of five and the list of known social sentiment categories of: highly satisfied, satisfied, neutral, unsatisfied, and highly unsatisfied as defined by the social media site. In another embodiment, semantic sentiment program 200 receives the social sentiment category threshold and the list of predefined social sentiment categories as defined by the user through sematic sentiment client program 114. For example, a photograph from a family reunion includes fifty people, a banner, Niagara Falls, trees, and a sunny sky. The user selects a social sentiment category threshold of three and identifies and lists the social sentiment categories as: people (fifty people), event (family reunion), and scenery (Niagara Falls, trees, and the sunny sky).

In step 204, semantic sentiment program 200 receives a ranking of social sentiment categories. Semantic sentiment program 200 utilizes the ranking to determine which semantic attributes are mapped to the available social sentiment categories (also includes semantic attributes) as allowed by the social sentiment category threshold. For example, when semantic sentiment program 200 utilizes image analysis to analyze image 116, more semantic attributes may be identified than are allowed as social sentiment categories. In one embodiment, semantic sentiment program 200 receives a statically defined ranking of social sentiment categories (e.g., defined by the service provider, user, etc.). For example, the service provider may have specific semantic attributes that are of higher rank and importance when later employing image analysis, such as people are ranked first, followed by pets, scenery features, and sky. In another embodiment, semantic sentiment program 200 receives a dynamically defined ranking of social sentiment categories. In one embodiment, semantic sentiment program 200 derives in real time the dynamically defined ranking of semantic attributes based on streaming data available through social media (e.g., likes, ratings, etc.) associated with the uploaded post. In another embodiment, semantic sentiment program 200 derives in real time the dynamically defined ranking of semantic attributes based on streaming data available through social media (e.g., likes, ratings, etc.) associated with similar posts. For example, semantic sentiment program 200 determines more users comment on scenery and sky semantic attributes than on pets, and changes the rank to be people, scenery, sky, and then pets.

In step 206, semantic sentiment program 200 uploads content to the social media site. In one embodiment, semantic sentiment program 200 uploads (e.g., posts) image 116 to the social media site. In another embodiment, semantic sentiment program 200 uploads text (e.g., comment) to the social media site. In some other embodiment, semantic sentiment program 200 uploads image 116 and text to the social media site. For example, as depicted in uploaded image 300 of FIG. 3A, a user selects to upload image 116, an image of steam exiting a geyser at the start of an eruption, through semantic sentiment client program 114 via user interface 112. Semantic sentiment program 200 accesses the social media site and uploads (e.g., posts, publishes, makes available on the Internet) image 116, which may then be viewed and commented upon by other users at any point.

In step 208, semantic sentiment program 200 identifies objects within image 116 through image analysis. Image analysis is the extraction of meaningful information from image 116 (e.g., bar code tags, facial recognition). In one embodiment, semantic sentiment program 200 utilizes digital image processing that utilizes computer algorithms to process image 116 through mathematical operations resulting in an output of either a related image (e.g., image 116 is sharpened, smoothed, manipulated, etc.) and/or a set of characteristics or parameters related to image 116 (e.g., measurable factor that aids in defining image 116, viewable characteristics). In another embodiment, semantic sentiment program 200 utilizes computer image analysis that includes pattern recognition, digital geometry, and signal processing (e.g., 2D and 3D object recognition, image segmentation, facial recognition, etc.). In yet some other embodiment, semantic sentiment program 200 utilizes object-based image analysis (OBIA), which utilizes processes that segment and classify pixels within the image into groups (e.g., homogeneous objects). The homogeneous objects can have different shapes and scales and include associated statistics (e.g., geometry, context, and textures), which semantic sentiment program 200 utilizes to classify the homogeneous objects within the image. In embodiments where the uploaded content does not include image 116, semantic sentiment program 200 does not perform image analysis.

In one embodiment, semantic sentiment program 200 receives predefined rules from a user through user interface 112 via semantic sentiment client program 114 for utilization by the image analysis software. For example, the rules may include viewable characteristics, such as objects to extract, colors, and object boundaries that are included within image 116. In another embodiment, semantic sentiment program 200 utilizes image analysis software to identify and extract features (e.g., viewable characteristics) from image 116 without predefined rules from the user. Semantic sentiment program 200 in conjunction with the image analysis software recognizes and extracts the objects from image 116. Semantic sentiment program 200 compares the extracted objects from image 116 real time with a repository of known object data in order to identify the object. Semantic sentiment program 200 identifies co-relationships between the extracted objects and identifies different semantic attributes.

Figure 3A:
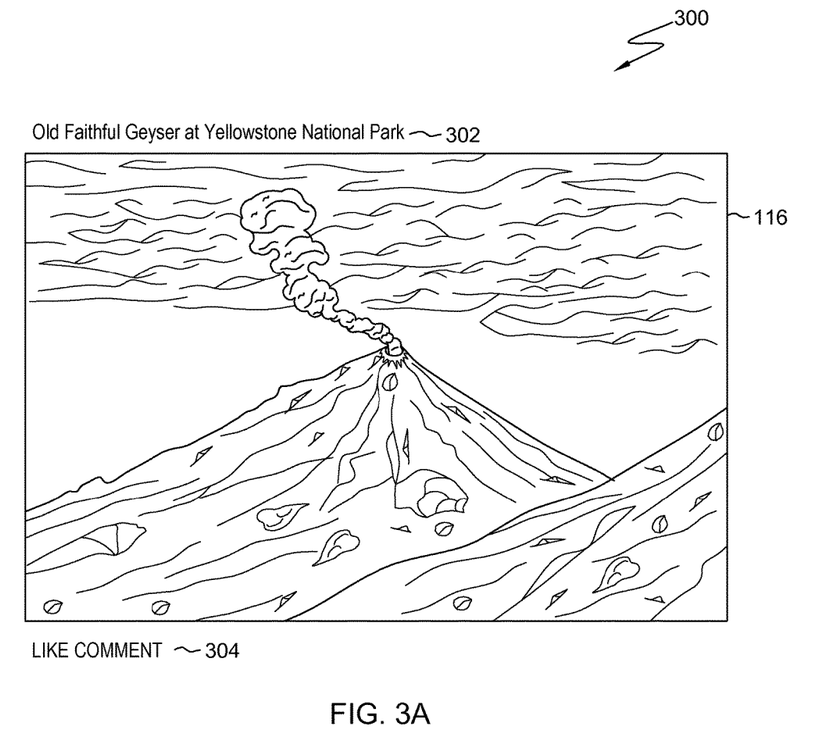
FIG. 3A depicts an example of an image uploaded to a social media site prior to utilizing the semantic sentiment program within the social media environment of FIG. 1, in accordance with an embodiment of the present invention.

For example, based on image 116 as depicted in FIG. 3A, semantic sentiment program 200 receives predefined rules to identify white objects, blue and white objects, triangular-shaped objects, and receives boundaries on a white semi-opaque object. Semantic sentiment program 200 extracts an interconnected white tapering object, two triangular-shaped objects, blue and white pixelated areas, and the bounded area. Semantic sentiment program 200 compares the extracted objects to the repository of known objects and determines the interconnected white tapering objects are clouds and/or steam, the triangle are geysers, hills, and/or mountains, the blue and white area is sky, and the white semi-opaque object is a cloud. Semantic sentiment program 200 identifies the steam is coming from the geyser and identifies a co-relationship between the steam and geyser (e.g., eruption).

In step 210, semantic sentiment program 200 determines semantic attributes of the objects within image 116. In one embodiment, semantic sentiment program 200 determines semantic attributes of the objects within image 116 based upon the known object data and/or co-relationships between objects (e.g., semantic attributes correspond to viewable characteristics of the objects within image 116). In another embodiment, semantic sentiment program 200 determines semantic attributes of the objects within image 116 through natural language processing (e.g., derives meaning from human or natural language input) of textual content posted in association with image 116. For example, as depicted in FIG. 3A, the user responsible for posting image 116 includes comment 302 of "Old Faithful Geyser at Yellowstone National Park." Based on the words of the posted comment, semantic sentiment program 200, through natural language processing, determines "Old Faithful Geyser" is the name of a known active geyser located within the Upper Geyser Basin of Yellowstone National Park. Therefore, semantic sentiment program 200 determines the semantic attributes associated with image 116 from the posted content are "Old Faithful Geyser" and "Yellowstone National Park," and semantic sentiment program 200 determines the steam and blue/white sky based on image 116 alone. In yet some other embodiment, semantic sentiment program 200 determines semantic attributes through natural language processing of posted textual content (e.g., image 116 is not included in the post).

In step 212, semantic sentiment program 200 maps the semantic attributes to social sentiment categories. In one embodiment, in which social sentiment categories are not provided but derived through image analysis, semantic sentiment program 200 additionally utilizes the semantic attributes identified within step 210 as a basis for creating social sentiment categories. Semantic sentiment program 200 utilizes the identified semantic attributes to derive names representative of a social sentiment category, thus creating the social sentiment category to allow users of a social media site to provide one or more fine-grained views or sentiments in the form of "likes," ratings, and comments.

Semantic sentiment program 200 creates a list of the semantic attributes for mapping (e.g., assigning semantic attributes to social sentiment categories). In one embodiment, semantic sentiment program 200 utilizes data mining techniques to map the list of semantic attributes to social sentiment categories. In another embodiment, semantic sentiment program 200 provides the user with an option for manual data entry to map the list of semantic attributes to the social sentiment categories. In some other embodiment, semantic sentiment program 200 utilizes natural language processing to perform a lemmatization of the list of semantic attributes into a normalized form. Lemmatization is the process of grouping together the different inflected forms a word so that the group of words can be analyzed as a single item. For example, the verb "run" may appear as "ran," "run," or "running." The base form, "run" is the lemma (e.g., headword) that would be looked up in a dictionary to determine a meaning. The combination of the base form with the part of speech is called the lexeme of the word (e.g., unit of lexical meaning that exists regardless of the number of inflectional endings or the number of words the lexeme may contain). Semantic sentiment program 200, therefore, groups all connotations of the word "run" into a single social sentiment category.

In one embodiment, semantic sentiment program 200 defines a behavior for the ranking of social sentiment categories based on statically defined social sentiment categories. Semantic sentiment program 200 evaluates the lemma of semantic attributes derived from image 116 with statically defined social sentiment categories. Semantic sentiment program 200 stores a list of possible semantic attributes based on known statically defined social sentiment categories in a hash table. The hash table is a data structure used to implement an associative array, a structure that maps keys to values. For example, the hash table combines the semantic attributes from the image analysis of image 116 with the semantic attributes from the natural language processing with the social sentiment categories. Semantic sentiment program 200 ranks the semantic attributes based on the predefined ranking of the social sentiment categories. For example, ten social sentiment categories may be possible; however, image 116 may only include five sematic attributes, and/or some of the semantic attributes within image 116 may not be of interest to be statically defined. Semantic sentiment program 200 generates a list of semantic attributes that mapped to the social sentiment categories based on the social sentiment category rankings and the social sentiment category threshold. Semantic sentiment program 200 utilizes the mapping within the hash table to the social sentiment categories to reduce the semantic attributes into the social sentiment categories for display on the social media site.

In another embodiment, semantic sentiment program 200 defines a behavior for the ranking of social sentiment categories based on dynamically defined social sentiment categories. Semantic sentiment program 200 receives the semantic attributes in lemmatized form. Semantic sentiment program 200 evaluates the semantic attributes for ranking based on the feedback from the social media site. For example, semantic sentiment program 200 creates a ranking based on the popularity of the semantic attributes by the number of "likes" received, rating, or other sentiment. Semantic sentiment program 200 maps the ranked list of semantic attributes to the social sentiment categories as semantic sentiment program 200 receives feedback in real time. For example, semantic sentiment program 200 performs an evaluation by obtaining the ranking popularity from the social media site. Semantic sentiment program 200 maps the ranked semantic attributed to the social sentiment categories. Semantic sentiment program 200 provides the social sentiment categories that are within the social sentiment category threshold. For example, semantic sentiment program 200 includes five social sentiment categories but creates ten social sentiment categories from the ranked semantic attribute list. Semantic sentiment program 200 selects the top five social sentiment categories for later use.

In step 214, semantic sentiment program 200 updates image 116 on the social media site with social sentiment categories. In one embodiment, semantic sentiment program 200 adds the social sentiment categories to the posted version of image 116 on the social media, thus providing additional social sentiments for users to comment upon through the social media site. For example, as illustrated in uploaded image 350 with additional sentiment categories (FIG. 3B), image 116 now includes: social sentiment category 352 (e.g., color of sky), social sentiment category 354 (e.g., steam), social sentiment category 356 (e.g., Old Faithful Geyser), social sentiment category 358 (e.g., clouds), and social sentiment category 360 (e.g., Yellowstone National Park), as opposed to one social sentiment category encompassing all of image 116 as illustrated in FIG. 3A as social sentiment category 304. In another embodiment, semantic sentiment program 200 combines similar social sentiment categories into one. For example, image 116 includes mountains, a lake, and trees, and semantic sentiment program 200 combines the three semantic attributes into a single social sentiment category of background scenery. In some other embodiment, the social sentiment categories may be enabled and/or disabled at the discretion of the user that posted image 116 and the associated content (e.g., a single social sentiment category or multiple social sentiment categories) may be displayed.

Figure 3B:
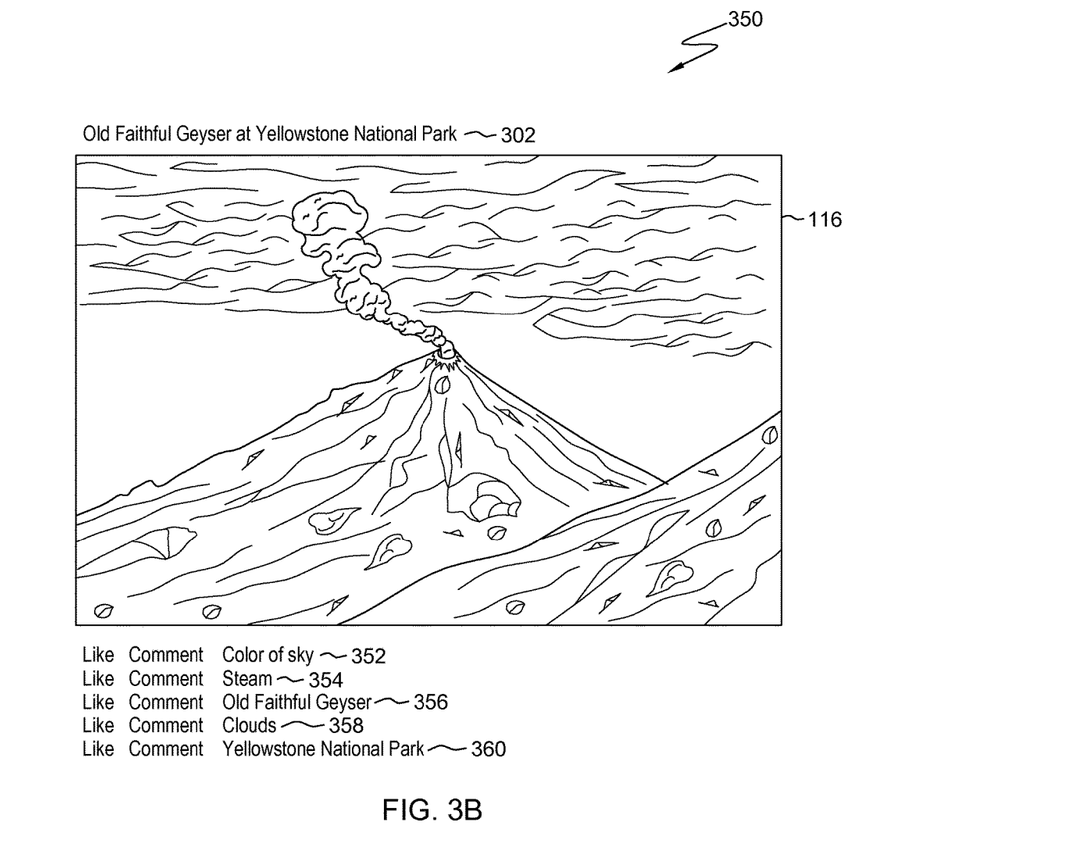
FIG. 3B depicts an example of an image uploaded to a social media site that utilizes the semantic sentiment program to add additional sentiments to the image for user responses within the social media environment of FIG. 1, in accordance with an embodiment of the present invention.

In step 216, semantic sentiment program 200 receives user feedback through social sentiment categories. Semantic sentiment program 200 displays the social sentiment categories (e.g., social sentiment categories 352, 354, 356, 358, and 360) associated with image 116 to users through the social media site (e.g., each social sentiment category includes feedback options). For example, the social sentiment category includes feedback options that allow a user to select "like," add a rating, select a number of stars, and/or add a comment in response to a post. Once the posted version of image 116 includes the social sentiment categories with feedback options, semantic sentiment program 200 receives user feedback from one or more users viewing the posted version of image 116 when the users add content (e.g., feedback) to the post through user interface 112. Semantic sentiment program 200 may receive feedback for more than one social sentiment category from the same user (e.g., "likes" two of the five social sentiment categories). Additionally, semantic sentiment program 200 may receive multiple types of feedback associated with the same social sentiment category (e.g., adds a "like" and a comment to a single social sentiment category).

In step 218, semantic sentiment program 200 analyzes social sentiment category feedback and provides items of interest. In one embodiment, semantic sentiment program 200, through semantic sentiment client program 114, receives user-entered preferences pertaining to displaying the received feedback. In another embodiment, semantic sentiment program 200 analyzes social sentiment categories based on predefined settings (e.g., default program setting, stored user preferences, etc.). Semantic sentiment program 200 analyzes the received feedback based on preferences, such as grouping, filters, and searches (e.g., date, new comment, user name, social sentiment category, key word, etc.). For example, through semantic sentiment client program 114 via user interface 112, the user specifies a specific user name for semantic sentiment program 200 to filter on. Semantic sentiment program 200 returns items of interest that include only the specified user for the user to view. In another embodiment, semantic sentiment program 200 analyzes social sentiment category feedback through predefined settings (e.g., default social media site settings, last known saved preferences, most used settings, etc.) and provides items of interest based on the predefined settings.

In one embodiment, semantic sentiment program 200 analyzes the received feedback and delivers appropriate services to the user responsible in response to received feedback. Semantic sentiment program 200 aggregates the feedback from the social sentiment categories. Semantic sentiment program 200, based on the aggregated feedback, determines and delivers services (e.g., advertisements, recommendations, points of interest, etc.) to the user. In another embodiment, semantic sentiment program 200 provides service to the user based on a pattern semantic sentiment program 200 determines through multiple posts. For example, through semantic sentiment client program 114, a user posts multiple instance of scuba diving trips over time and likes pages of scuba diving equipment shops and scuba diving tour companies. The user then includes a post indicating the user is on vacation in Queensland, Australia. Another user viewing the post likes the social sentiment category associated with Queensland, Australia and adds a comment, "You should dive the Great Barrier Reef." From the previous posts and the content within the comment, semantic sentiment program 200 provides the user with diving companies that provide tours to the Great Barrier Reef and companies that rent diving equipment.

In some other embodiment, semantic sentiment program 200 analyzes social sentiment category feedback posted by the user to identify patterns and incorporates cross selling. Cross selling is the action or practice of selling additional product and/or service to an existing customer. For example, a user "likes" posts made by other users on a social media site pertaining to stalactites and stalagmites and rates posts of underground caverns highly. Based on the pattern, semantic sentiment program 200 determines the user may be interested in events or travel destinations associated with viewing Natural Bridge Caverns in Texas, Howe Caverns in New York, and Luray Caverns in Virginia. Semantic sentiment program 200 provides advertisements associated with the caverns, travel specials, and other related cavern formations to the user. In yet some other embodiment, semantic sentiment program 200 analyzes posts of other users with similar patterns (e.g., interests) and provides cross selling based on the analysis of the other users to the user of the post.

In step 220, semantic sentiment program 200 organizes and displays social sentiment categories for viewing by the user. In one embodiment, semantic sentiment program 200 utilizes a predefined stacking rule within semantic sentiment program 200 (e.g., chronological order, highest to lowest number of likes, most comments, by users, etc.). In another embodiment, semantic sentiment program 200 receives a user-defined stacking rule based on user preferences entered by the user through semantic sentiment client program 114 (e.g., unread comments, date range, specific users, group, social sentiment categories, etc.). Semantic sentiment program 200 applies the stacking rule to the post and displays the information for viewing by the user (e.g., overlapping stacked posts, selectable tabs, etc.).

Figure 4A:
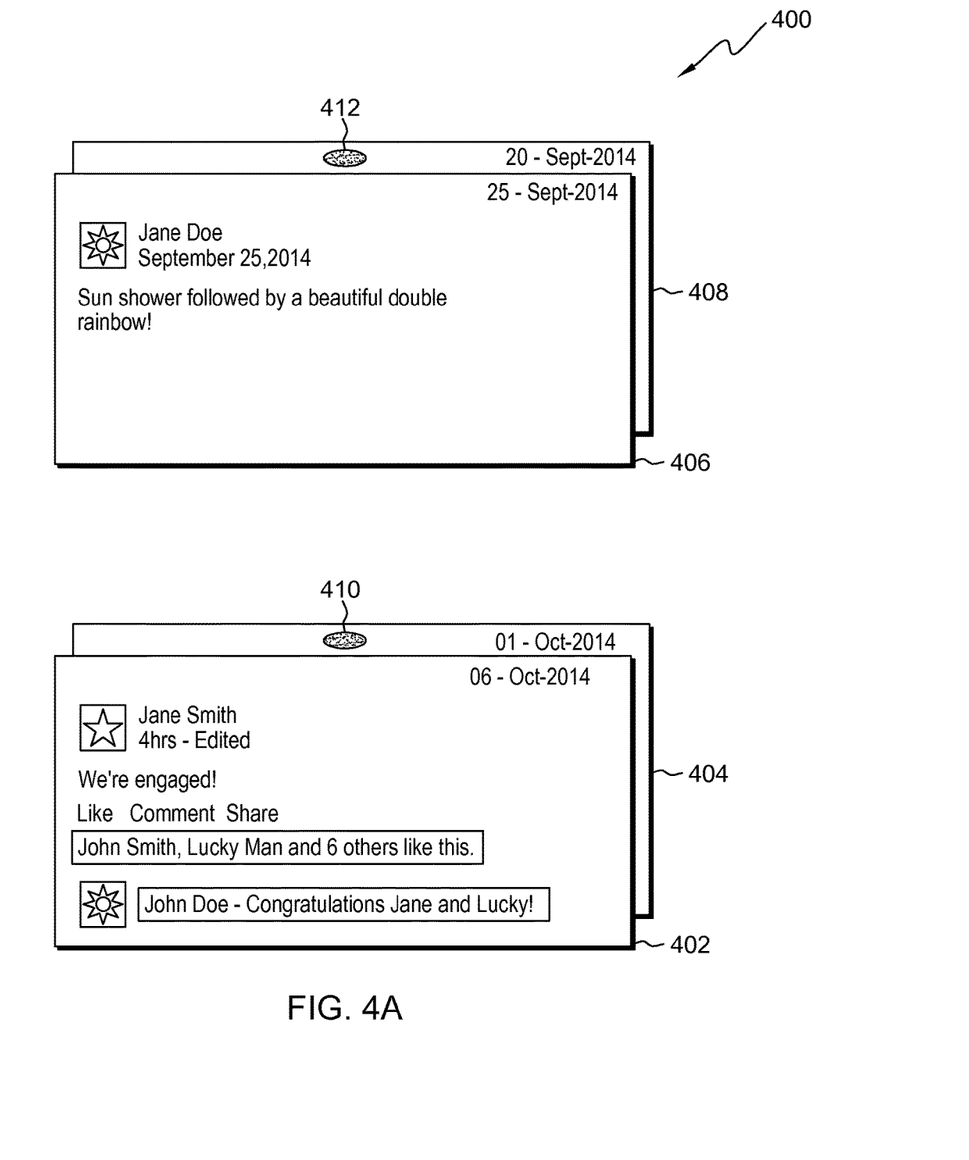
FIG. 4A depicts an example of the user interface employing the sematic sentiment program to provide feedback to the user based on received sentiment through stacked social content, in accordance with an embodiment of the present invention.

For example, as depicted in FIG. 4A of social media site display 400, semantic sentiment program 200 organizes the feedback in chronological order by specific users (e.g., friends). Semantic sentiment program 200 creates two stacks; one for Jane Doe that includes post 406 and post 408, and a second stack for Jane Smith that includes post 402 and post 404. Semantic sentiment program 200 organizes the two separate stacks of posts into individual posts in chronological order starting with displaying the most recent post and finishing with the oldest post. Semantic sentiment program 200 displays the posts by overlapping the older posts with the subsequent newer posts. Semantic sentiment program 200 displays relevant information from the previous posts, such as the dates and unread post indicators 410 and 412 (e.g., circular symbol, word "new," star, bolding of text, etc.) associated with each individual post within the stack for viewing by the user.

In one embodiment, semantic sentiment program 200 reorganizes the stacks at any point upon receipt of a change to the stacking rule based (e.g., changes to predefined stacking rules or changes to stacking rules based on user preferences). In another embodiment, semantic sentiment program 200 reorganizes the stacks based on input from the user through user interface 112 via semantic sentiment program 200 when viewing and navigating through posts. In one embodiment, semantic sentiment program 200 receives a user action via user interface 112 (e.g., a swiping motion, a double tap, a mouse click, etc.) to navigate to another post within the stack. Semantic sentiment program 200 moves the selected post based on the type of user action received and placement within the stack.

Figure 4B:
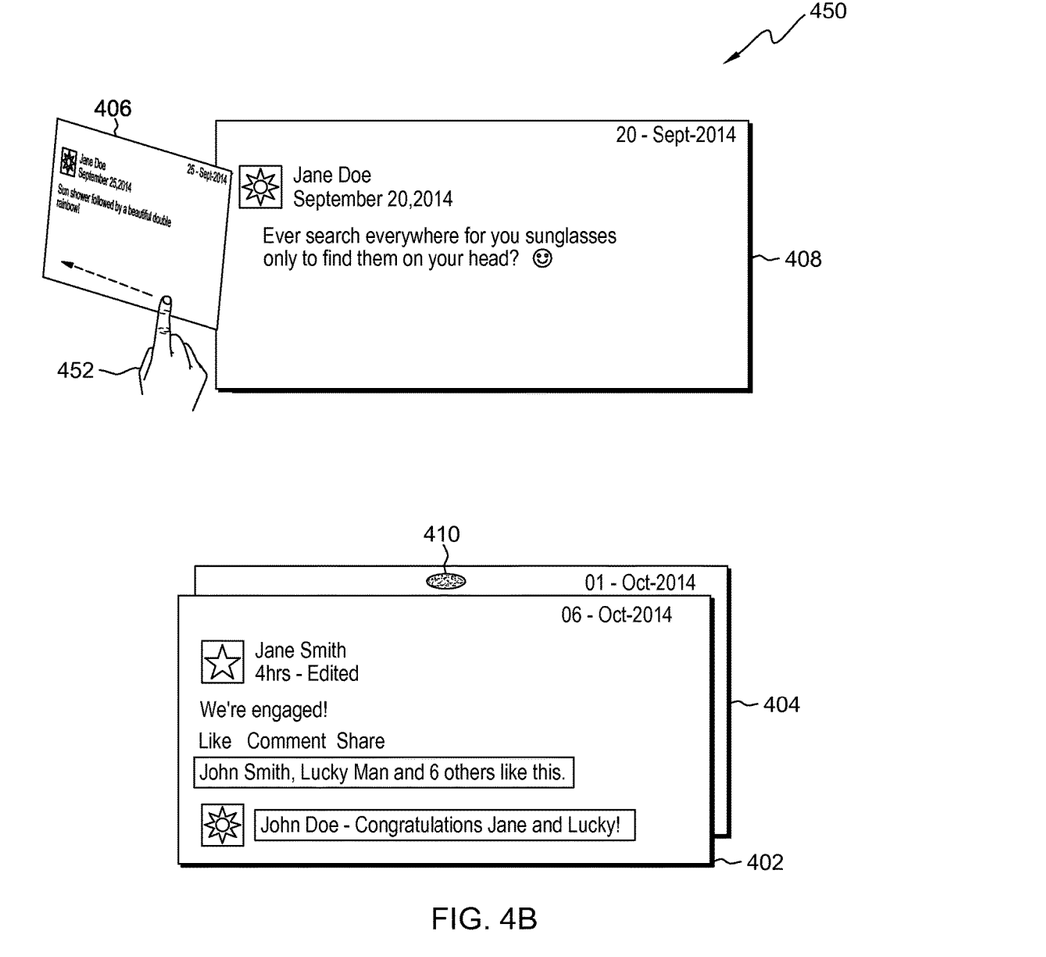
FIG. 4B depicts an example of a user navigating through the stacked social content, in accordance with an embodiment of the present invention.

In one embodiment, semantic sentiment program 200 receives a user action relative to the first post within the stack (e.g., current post showing at the top of the stack). For example, as depicted in FIG. 4B of social media site updated display 450, user interface 112 is a touch screen device. Through touchscreen gesture 452 (e.g., right to left swiping motion, drag and pull, etc.), the user selects post 406. Semantic sentiment program 200 identifies touch screen gesture 452 as an advancement (e.g., progression) to post 408. Semantic sentiment program 200 moves post 408 to the front for viewing and removes unread post indicator 412 from post 408. As semantic sentiment program 200 did not identify a user selection associated with post 402 and post 404, semantic sentiment program 200 does not change the order of the stack associated with the second specific user.

In another embodiment, semantic sentiment program 200 receives the user action relative to a post within the stack not currently displayed (e.g., a swiping motion, a double tap, a mouse click, etc.). In one embodiment, semantic sentiment program 200 returns the previously displayed post to the stacked posts in chronological order except for the newly selected post. In another embodiment, semantic sentiment program moves any posts within the stack that occur prior to the newly selected post to the back of the stack. In some other embodiment, semantic sentiment program 200 minimizes (e.g., hides) the previous posts maintaining the stacking order but displays the newly selected post for viewing.

In yet another embodiment, semantic sentiment program 200 maintains the current stack order but moves the selected post to the front.

Figure 5:
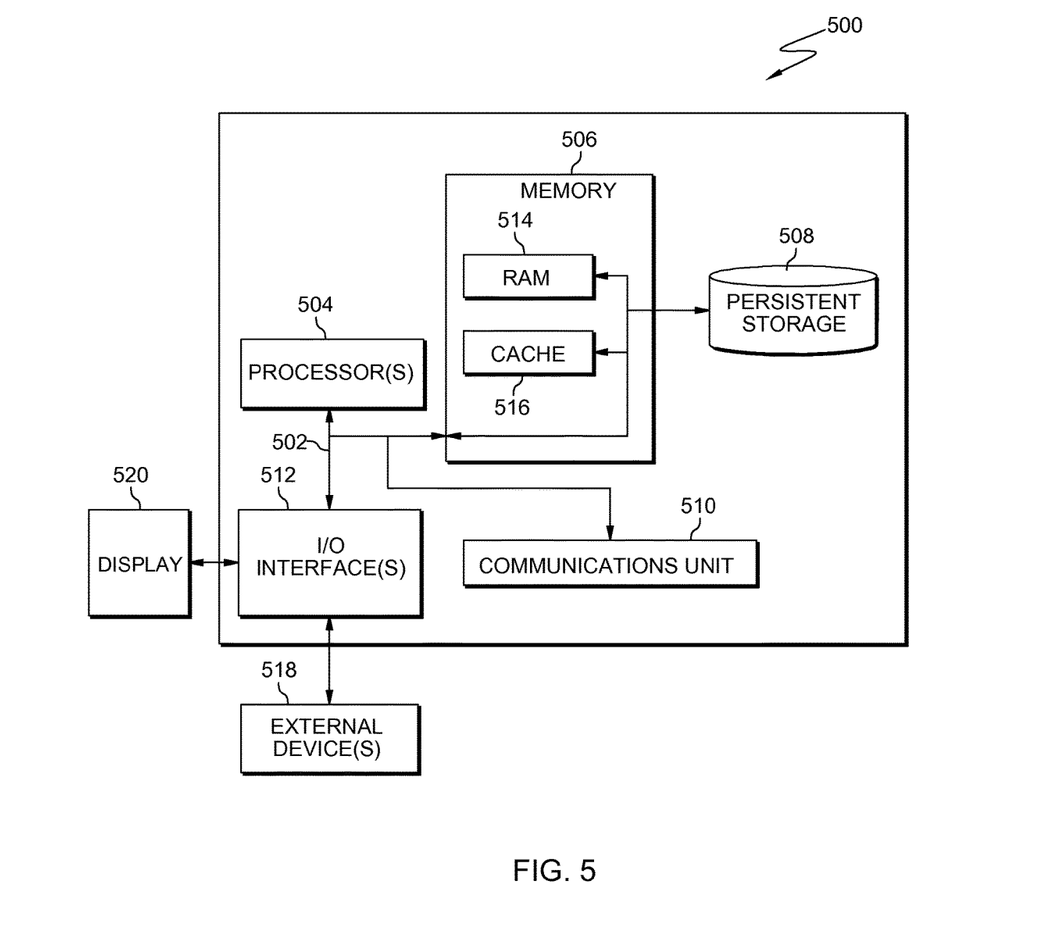
FIG. 5 is a block diagram of components of the server computer executing the semantic sentiment program, in accordance with an embodiment of the present invention.

FIG. 5 depicts a block diagram of components of server computer 500 operating semantic sentiment program 200, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server computer 500 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM) 514. In general, memory 506 can include any suitable volatile or non-volatile computer readable storage media. Cache 516 is a fast memory that enhances the performance of computer processor(s) 504 by holding recently accessed data, and data near accessed data, from memory 506.

User interface 112, semantic sentiment client program 114, image 116, semantic sentiment program 200 may be stored in persistent storage 508 and in memory 506 for execution and/or access by one or more of the respective computer processor(s) 504 via cache 516. In an embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. User interface 112, semantic sentiment client program 114, image 116, semantic sentiment program 200 may be downloaded to persistent storage 508 through communications unit 510.

I/O interface(s) 512 allows for input and output of data with other devices that may be connected to server computer 500. For example, I/O interface(s) 512 may provide a connection to external device(s) 518, such as a keyboard, a keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., user interface 112, semantic sentiment client program 114, image 116, semantic sentiment program 200, can be stored on such portable computer readable storage media and can be loaded onto persistent storage 508 via I/O interface(s) 512. I/O interface (s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for adding categories to a social media site, the method comprising:
    identifying, by one or more computer processors, one or more semantic attributes of content uploaded on a social media site, wherein the identified one or more semantic attributes are descriptive subcategories that exist in a hierarchy tiering to a top level sentiment category based on viewable characteristics of the content uploaded that include objects, colors, and boundaries wherein one or more of the viewable characteristics are assigned to a sentiment category that conveys a message represented by a context between signifiers, wherein the signifiers include words, phrases, signs, and symbols that describe the viewable characteristics;
    mapping, by one or more computer processors, the identified one or more semantic attributes to the one or more categories based on similarities between the viewable characteristics of the identified one or more semantic attributes;
    adding, by one or more computer processors, the one or more mapped categories to the content uploaded on the social media site, wherein the one or more mapped categories add granularity to comment specifically on viewable characteristics within the content uploaded; and
    initiating, by one or more computer processors, display of the mapped one or more categories with the derived name that are added to the content uploaded on the social media site.

2. The method of claim 1, wherein the one or more mapped categories with a derived name that are added to the content uploaded on the social media site are each capable of receiving user input from users of the social media site.

3. The method of claim 1, wherein identifying one or more semantic attributes of the content uploaded on the social media site further comprises:
    extracting, by one or more computer processors, one or more objects from an image associated with the content uploaded on the social media site utilizing image analysis and one or more rules, wherein the image analysis includes pattern recognition, digital geometry, signal processing, object-based image analysis, and digital image processing with a set of parameters related to the content uploaded;
    identifying, by one or more computer processors, the one or more extracted objects by comparing the one or more extracted objects with a repository of known objects;
    identifying, by one or more computer processors, one or more co-relationships between the one or more extracted objects;
    identifying, by one or more computer processors, one or more semantic attributes of the image that are defined by the identified one or more objects and the identified one or more co-relationships;
    creating, by one or more computer processors, one or more categories that correspond to the identified one or more semantic attributes of the image;
    sorting, by one or more computer processors, each of the identified one or more objects into the created one or more categories, based on the identified one or more semantic attributes that are associated with the identified one or more objects; and
    deriving, by one or more computer processors, a name for each of the one or more categories for each of the identified one or more semantic attributes, wherein the name provides a meaning for focused feedback.

4. The method of claim 1, wherein identifying one or more semantic attributes of the content uploaded on the social media site further comprises:
    analyzing, by one or more computer processors, posted text associated with the content uploaded on the social media site utilizing natural language processing;
    identifying, by one or more computer processor, one or more sematic attributes of the analyzed posted text associated with the content uploaded on the social media site;
    creating, by one or more computer processors, one or more categories that correspond to the identified one or more semantic attributes of the analyzed posted text; and
    deriving, by one or more computer processors, a name for each of the one or more categories based in part on the analyzed posted text.

5. The method of claim 1, wherein mapping the identified one or more semantic attributes to the one or more categories based on shared viewable characteristics of the identified one or more sematic attributes further comprises:
    storing, by one or more computer processors, the identified one or more sematic attributes in a list;
    receiving, by one or more computer processors, a category threshold that identifies a maximum number of categories associated with the content uploaded;
    determining, by one or more computer processors, that the one or more categories include one or more static categories;
    receiving, by one or more computer processors, a ranking of the one or more static categories from one or more of: a social media site and a user;
    determining, by one or more computer processors, one or more semantic attributes that are associated with the one or more static categories utilizing natural language processing and lemmatization of the stored list of the identified one or more sematic attributes, wherein the lemmatization groups different inflected forms of a word associated with the identified one or more semantic attributes into a single sentiment category;
    storing, by one or more computer processors, the determined one or more sematic attributes that are associated with the one or more static categories in a hash table based on the received ranking, wherein the hash table combines one or more semantic attributes from an image analysis and one or more semantic attributes from natural language processing; and updating, by one or more computer processors, the ranked one or more categories based on the received category threshold.

6. The method of claim 1, wherein mapping the identified one or more semantic attributes to the one or more categories based on shared viewable characteristics of the identified one or more sematic attributes further comprises:

storing, by one or more computer processors, the identified one or more sematic attributes in a list;

receiving, by one or more computer processors, a category threshold that identifies a maximum number of categories associated with the content uploaded;

determining, by one or more computer processors, that the one or more categories include one or more dynamic categories;

determining, by one or more computer processors, a ranking of the stored list of the identified one or more semantic attributes based on streaming data from the social media site and user feedback from the social media site;

creating, by one or more computer processors, one or more categories based on the received category threshold and the determined ranking of the stored list;

assigning, by one or more computer processors, the one or more semantic attributes to the created one or more categories; and updating, by one or more computer processors, the ranked one or more categories based on the received category threshold.

7. The method of claim 1, further comprises:

receiving, by one or more computer processors, user feedback input into the added mapped one or more categories to the content uploaded on the social media site, wherein the user feedback includes one or more of: comments, likes, and ratings;

receiving, by one or more computer processors, user input on content of the social media site, wherein the input includes one or more of: grouping content, filtering content, and searching content; and organizing, by one or more computer processors, the received user feedback into one or more stacks of content on the social media site based on the received input and a stacking rule, wherein the stacking rule defines an order for viewing and a presentation manner associated with the order for viewing, wherein the order for viewing is based on one or more of a chronological order, a highest to lowest number of likes, most comments, unread comments, a date range, one or more specific users, a group, and one or more specified sentiment categories, wherein the presentation manner includes one of: overlapping posts and selectable tabs.

8. The method of claim 7, further comprises:

initiating, by one or more computer processor, display of one or more stacks of content on the social media site, wherein the one or more stacks of content include the organized user feedback;

receiving, by one or more computer processors, a user selection from within the initiated display of one or more stacks of content on the social media site;

reorganizing, by one or more computer processors, the initiated display of one or more stacks of content on the social media site based on the received user selection; and initiating, by one or more computer processors, display of the reorganized one or more stacks of content on the social media site.

9. A computer program product for adding categories to a social media site, the computer program product comprising:

one or more computer readable storage media and program instructions stored on the one or more computer readable storage media, the program instructions comprising:

program instructions to identify one or more semantic attributes of the content uploaded on a social media site, wherein the identified one or more semantic attributes are descriptive subcategories that exist in a hierarchy tiering to a top level sentiment category based on viewable characteristics of the content uploaded that include objects, colors, and boundaries, wherein one or more of the viewable characteristics are assigned to a sentiment category that conveys a message represented by a context between signifiers, wherein the signifiers include words, phrases, signs, and symbols that describe the viewable characteristics;

program instructions to map the identified one or more semantic attributes to the one or more categories based on similarities between the viewable characteristics of the identified one or more semantic attributes;

program instructions to add the one or more mapped categories to the content uploaded on the social media site; and program instructions initiate display of the mapped one or more categories with the derived name that are added to the content uploaded on the social media site, wherein the one or more mapped categories add granularity to comment specifically on viewable characteristics within the content uploaded.

10. The computer program product of claim 9, wherein the one or more mapped categories with the derived name that are added to the content uploaded on the social media site are each capable of receiving user input from users of the social media site.

11. The computer program product of claim 9, wherein to identify one or more semantic attributes of the content uploaded on the social media site further comprises program instructions, stored on the one or more computer readable storage media, to:

extract one or more objects from an image associated with the content uploaded on the social media site utilizing image analysis and one or more rules, wherein the image analysis includes one or more of: pattern recognition, digital geometry, signal processing, object-based image analysis, and digital image processing with a set of parameters related to the content uploaded;

identify the one or more extracted objects by comparing the one or more extracted objects with a repository of known objects;

identify one or more co-relationships between the one or more extracted objects;

identify one or more semantic attributes of the image that are defined by the identified one or more objects and the identified one or more co-relationships;

create one or more categories, that correspond to the identified one or more semantic attributes;

sort each of the identified one or more objects into the created one or more categories, based on the identified one or more semantic attributes that are associated with the identified one or more objects; and derive a name for each of the one or more categories for each of the identified one or more semantic attributes, wherein the name provides a meaning for focused feedback.

12. The computer program product of claim 9, wherein to identify one or more semantic attributes of the content uploaded on the social media site further comprises program instructions, stored on the one or more computer readable storage media, to:
   analyze posted text associated with the content uploaded on the social media site utilizing natural language processing;
   identify one or more sematic attributes of the analyzed posted text associated with the content uploaded on the social media site;
   create one or more categories that correspond to the identified one or more semantic attributes of the analyzed posted text; and
   derive a name for each of the one or more categories based in part on the analyzed posted text.

13. The computer program product of claim 9, wherein to map the identified one or more semantic attributes to the one or more categories based on shared viewable characteristics of the identified one or more sematic attributes further comprises program instructions, stored on the one or more computer readable storage media, to:
   store the identified one or more sematic attributes in a list;
   receive a category threshold that identifies a maximum number of categories associated with the content uploaded;
   determine that the one or more categories include one or more static categories;
   receive a ranking of the one or more static categories from one or more of: a social media site and a user;
   determine one or more semantic attributes that are associated with the one or more static categories utilizing natural language processing and lemmatization of the stored list of the identified one or more sematic attributes, wherein the lemmatization groups different inflected forms of a word associated with the identified one or more semantic attributes into a single sentiment category;
   store the determined one or more semantic attributes that are associated with the one or more static categories in a hash table based on the received ranking, wherein the hash table combines one or more semantic attributes from an image analysis and one or more semantic attributes from natural language processing; and
   update the ranked one or more categories based on the received category threshold.

14. The computer program product of claim 9, wherein to map the identified one or more semantic attributes to the one or more categories based on shared viewable characteristics of the identified one or more sematic attributes further comprises program instructions, stored on the one or more computer readable storage media, to:
   store, the identified one or more sematic attributes in a list;
   receive a category threshold that identifies a maximum number of categories associated with the content uploaded;
   determine that the one or more categories include one or more dynamic categories;
   determine a ranking of the stored list of the identified one or more sematic attributes based on streaming data from the social media site and user feedback from the social media site;
   create one or more categories based on the received category threshold and the determined ranking of the stored list;
   assign the one or more semantic attributes to the created one or more categories; and
   update the ranked one or more categories based on the received category threshold.

15. A computer system for adding categories to a social media site, the computer system comprising:
   one or more computer processors, one or more computer readable storage media, and program instructions stored on the computer readable storage media for execution by at least one of the one or more processors, the program instructions comprising:
   program instructions to identify one or more semantic attributes of the content uploaded on a social media site, wherein the identified one or more semantic attributes are descriptive subcategories that exist in a hierarchy tiering to a top level sentiment category based on viewable characteristics of the content uploaded that include objects, colors, and boundaries, wherein one or more of the viewable characteristics are assigned to a sentiment category that conveys a message represented by a context between signifiers, wherein the signifiers include words, phrases, signs, and symbols that describe the viewable characteristics;
   program instructions to map the identified one or more semantic attributes to the one or more categories based on similarities between the viewable characteristics of the identified one or more semantic attributes;
   program instructions to add the one or more mapped categories to the content uploaded on the social media site, wherein the one or more mapped categories add granularity to comment specifically on viewable characteristics within the content uploaded; and
   program instructions initiate display of the mapped one or more categories with the derived name that are added to the content uploaded on the social media site.

16. The computer system of claim 15, wherein the one or more mapped categories with the derived name that are added to the content uploaded on the social media site are each capable of receiving user input from users of the social media site.

17. The computer system of claim 15, wherein to identify one or more semantic attributes of the content uploaded on the social media site further comprises program instructions, stored on the one or more computer readable storage media, to:
   extract one or more objects from an image associated with the content uploaded on the social media site utilizing image analysis and one or more rules, wherein the image analysis includes one or more of: pattern recognition, digital geometry, signal processing, object-based image analysis, and digital image processing with a set of parameters related to the content uploaded;
   identify the one or more extracted objects by comparing the one or more extracted objects with a repository of known objects;
   identify one or more co-relationships between the one or more extracted objects;
   identify one or more semantic attributes of the image that are defined by the identified one or more objects and the identified one or more co-relationships;
   create one or more categories, that correspond to the identified one or more semantic attributes;
   sort each of the identified one or more objects into the created one or more categories, based on the identified one or more semantic attributes that are associated with the identified one or more objects; and derive a name for each of the one or more categories for each of the identified one or more semantic attributes, wherein the name provides a meaning for focused feedback.

18. The computer system of claim 15, wherein to identify one or more semantic attributes of the content uploaded on the social media site further comprises program instructions, stored on the one or more computer readable storage media, to:

analyze posted text associated with the content uploaded on the social media site utilizing natural language processing;

identify one or more sematic attributes of the analyzed posted text associated with the content uploaded on the social media site;

create one or more categories that correspond to the identified one or more semantic attributes of the analyzed posted text; and derive a name for each of the one or more categories based in part on the analyzed posted text.

19. The computer system of claim 15, wherein to map the identified one or more semantic attributes to the one or more categories based on shared viewable characteristics of the identified one or more sematic attributes further comprises program instructions, stored on the one or more computer readable storage media, to:

store the identified one or more sematic attributes in a list;

receive a category threshold that identifies a maximum number of categories associated with the content uploaded;

determine that the one or more categories include one or more static categories;

receive a ranking of the one or more static categories from one or more of: a social media site and a user;

determine one or more semantic attributes that are associated with the one or more static categories utilizing natural language processing and lemmatization of the stored list of the identified one or more sematic attributes, wherein the lemmatization groups different inflected forms of a word associated with the identified one or more semantic attributes into a single sentiment category;

store the determined one or more sematic attributes that are associated with the one or more static categories in a hash table based on the received ranking, wherein the hash table combines one or more semantic attributes from an image analysis and one or more semantic attributes from natural language processing; and update the ranked one or more categories based on the received category threshold.

20. The computer system of claim 15, wherein to map the identified one or more semantic attributes to the one or more categories based on shared viewable characteristics of the identified one or more semantic attributes further comprises program instructions, stored on the one or more computer readable storage media, to:

store, the identified one or more sematic attributes in a list;

receive a category threshold that identifies a maximum number of categories associated with the content uploaded;

determine that the one or more categories include one or more dynamic categories;

determine a ranking of the stored list of the identified one or more sematic attributes based on streaming data from the social media site and user feedback from the social media site;

create one or more categories based on the received category threshold and the determined ranking of the stored list;

assign the one or more semantic attributes to the created one or more categories; and update the ranked one or more categories based on the received category threshold.

* * * * *